(12) United States Patent
Mannekutla et al.

(10) Patent No.: US 11,387,633 B2
(45) Date of Patent: Jul. 12, 2022

(54) CLOSING SWITCH AND SWITCHGEAR

(71) Applicant: ABB Schweiz AG, Baden (CH)

(72) Inventors: James Mannekutla, Västerås (SE); Ola Jeppsson, Västerås (SE); Stefan Valdemarsson, Lidköping (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/310,202

(22) PCT Filed: Jan. 21, 2020

(86) PCT No.: PCT/EP2020/051442
§ 371 (c)(1),
(2) Date: Jul. 26, 2021

(87) PCT Pub. No.: WO2020/164871
PCT Pub. Date: Aug. 20, 2020

(65) Prior Publication Data
US 2022/0045487 A1    Feb. 10, 2022

(30) Foreign Application Priority Data
Feb. 13, 2019   (EP) .................................. 19156880

(51) Int. Cl.
*H02B 13/00* (2006.01)
*H01H 9/02* (2006.01)
*H01H 1/06* (2006.01)

(52) U.S. Cl.
CPC .............. *H02B 13/00* (2013.01); *H01H 1/06* (2013.01); *H01H 9/02* (2013.01)

(58) Field of Classification Search
CPC . H02B 13/00; H01H 1/06; H01H 9/02; H01H 1/24; H01H 1/26; H01H 1/34;
(Continued)

(56) References Cited

U.S. PATENT DOCUMENTS

| | | | | |
|---|---|---|---|---|
| 3,103,569 A | * | 9/1963 | Reichardt | H01H 79/00 200/253.1 |
| 6,262,642 B1 | * | 7/2001 | Bauer | H01H 1/205 200/244 |
| 10,388,481 B2 | * | 8/2019 | Lell | H01H 39/006 |

FOREIGN PATENT DOCUMENTS

| | | |
|---|---|---|
| CN | 201898051 U | 7/2011 |
| CN | 105869953 A | 8/2016 |

(Continued)

OTHER PUBLICATIONS

International Preliminary Report on Patentability; Application No. PCT/EP2020/051442; dated Jan. 22, 2021; 14 Pages.
(Continued)

*Primary Examiner* — Edwin A. Leon
*Assistant Examiner* — Iman Malakooti
(74) *Attorney, Agent, or Firm* — Whitmyer IP Group LLC

(57) ABSTRACT

An electrical short-circuiting closing switch including an electrically insulating housing; a first electrode having a tapered first electrode opening; a second electrode having a tapered second electrode opening; a movable contact having a tapered profile, the movable contact being movable relative to the housing along a closing axis from an open position, in which the movable contact is electrically disconnected from the second electrode, to a closed position, in which the movable contact electrically connects the first electrode and the second electrode by engaging the tapered profile with the first electrode opening and the second electrode opening; and an actuator arranged to force the movable contact from the open position to the closed position; wherein at least one of the first electrode and the second electrode is flexibly attached to the housing. A switchgear including a closing switch is also provided.

20 Claims, 3 Drawing Sheets

(58) Field of Classification Search
CPC .... H01H 79/00; H01H 2223/00; H01H 39/00; H01H 39/002
USPC ................ 200/245, 293, 302.3, 339; 218/95
See application file for complete search history.

(56) References Cited

FOREIGN PATENT DOCUMENTS

| | | | |
|---|---|---|---|
| DE | 102010010669 A1 | | 9/2011 |
| DE | 102011113955 A1 | | 3/2012 |
| DE | 102015203646 | * | 9/2016 ............. H01H 39/00 |
| DE | 102015203646 A1 | | 9/2016 |
| EP | 3065156 A1 | | 9/2016 |
| EP | 2543056 B1 | | 1/2018 |
| GB | 2527800 A | | 1/2016 |
| WO | 2016001328 A1 | | 1/2016 |

OTHER PUBLICATIONS

International Search Report and Written Opinion of the International Searching Authority; Application No. PCT/EP2020/051442; Completed: Apr. 16, 2020; dated May 4, 2020; 14 Pages.
Chinese Final Office Action; Application No. 2020800132396; Completed: Dec. 31, 2021; dated Jan. 7, 2022; 15 Pages.

* cited by examiner

CLOSING SWITCH AND SWITCHGEAR

TECHNICAL FIELD

The present disclosure generally relates to a closing switch. In particular, an electrical short-circuiting closing switch and a switchgear comprising such closing switch, are provided.

BACKGROUND

Protection of switchgear equipment during an internal arc event is a high priority. An internal arc fault arises when at least part of the current passes through a dielectric, usually air, for example due to an arcing fault between phases, neutral or ground. When an internal arc fault occurs in the switchgear, the inside of the switchgear rapidly reaches high temperatures and high pressures. A circuit breaker can interrupt fault currents arising from internal arcs. However, the opening time of the circuit breaker may be relatively long, e.g. 30 to 60 ms. During this opening time, the internal arc might build up a high pressure that causes damage to components inside the switchgear.

By using a fast-closing short-circuiting switch that makes a solid phase to ground connection within a few milliseconds, it is possible to eliminate the internal arc before the circuit breaker has cleared the fault, by safely dissipating a short-circuit current to earth after the shortest possible time. Since the arc extinguishes after short-circuiting to earth, further damage in the switchgear can be avoided.

Some previously known closing switches comprise a moving piston that makes contact between phase and ground as soon as a fault is detected by optical sensors. Thereby, the switchgear can be short-circuited to protect the same. During an internal arc event, it is important to allow a very high current to pass through the closing switch.

CN 105869953 A discloses a switching device for short circuit arc extinction. The switching device comprises a casing, a gas generator, a piston and a moving contact arranged at the front end of the piston.

SUMMARY

One object of the present disclosure is to provide an electrical short-circuiting closing switch that enables establishment of an improved electrical contact between two electrodes.

A further object of the present disclosure is to provide an electrical short-circuiting closing switch that enables a stronger engagement of a movable contact with two electrodes.

A still further object of the present disclosure is to provide an electrical short-circuiting closing switch that enables a fast closing.

A still further object of the present disclosure is to provide an electrical short-circuiting closing switch that enables a reliable operation.

A still further object of the present disclosure is to provide an electrical short-circuiting closing switch that enables the use of relatively large tolerances.

A still further object of the present disclosure is to provide an electrical short-circuiting closing switch having a simple and/or cheap design.

A still further object of the present disclosure is to provide an electrical short-circuiting closing switch solving several or all of the foregoing objects in combination.

A still further object of the present disclosure is to provide a switchgear comprising a closing switch, which switchgear solves one, several or all of the foregoing objects.

According to one aspect, there is provided an electrical short-circuiting closing switch comprising an electrically insulating housing; a first electrode having a tapered first electrode opening; a second electrode having a tapered second electrode opening; a movable contact having a tapered profile, the movable contact being movable relative to the housing along a closing axis from an open position, in which the movable contact is electrically disconnected from the second electrode, to a closed position, in which the movable contact electrically connects the first electrode and the second electrode by engaging the tapered profile with the first electrode opening and the second electrode opening; and an actuator arranged to force the movable contact from the open position to the closed position; wherein at least one of the first electrode and the second electrode is flexibly attached to the housing.

In the open position, the movable contact is electrically disconnected from the second electrode. The movable contact may optionally also be electrically disconnected from the first electrode in the open position of the movable contact. When the actuator is actuated, the movable contact moves rapidly like a projectile from the open position to the closed position.

In the closed position, the tapered profile of the movable contact establishes an electrical bridge between the first electrode and the second electrode. To this end, the tapered profile, or the entire movable contact, may comprise, or be constituted by, an electrically conducting material, such as copper. The movable contact may be constituted by a piston.

The housing may be substantially or entirely made of an electrically insulating material, such as plastic. For example, the material of the housing may be an insulating thermoplastic material or a glass fiber reinforced thermoplastic material.

The first electrode and the second electrode may be separated by a gap, such as an air gap or a gap of some gas. The tapered profile may close the gap in the closed position of the movable contact. The first electrode and the second electrode may comprise, such as being constituted by, parallel plates, for example made of copper.

The closing switch may be used for internal arc protection in a low voltage switchgear. The closing switch according to the present disclosure may alternatively be referred to as an arc quenching device (AQD) or an earthing switch.

The tapered profile is tapered towards the closed position. In case the closing switch is vertically oriented, the closing movement is downwards, and the second electrode is arranged below the first electrode, the second electrode opening is slightly smaller than the first electrode opening.

The first electrode opening may be a through hole. The second electrode opening may be either a through hole or a blind hole.

Due to the tapered shape of the tapered profile, the first electrode and the second electrode, a clamping engagement between the tapered profile and the first electrode opening, and between the tapered profile and the second electrode opening, is established when the movable contact moves to the closed position. The movable contact becomes squeezed or wedged into the first electrode opening and the second electrode opening. In the closed position, the movable contact is thereby seated hard in the first electrode and in the second electrode. Some mechanical deformation of the movable contact, the first electrode and/or the second electrode may occur when the closing switch is closed.

Due to the flexible attachment of at least one of the first electrode and the second electrode to the housing, the first electrode and/or the second electrode is allowed to move slightly relative to the housing. Thereby, also the first electrode opening and/or the second electrode opening is allowed to move relatively to the closing axis, e.g. perpendicular to and/or parallel with the closing axis. The flexible attachment may alternatively be referred to as a resilient or elastic attachment.

When the movable contact is moved to the closed position, i.e. when the closing switch is closed, this flexible attachment in combination with the tapered profile of the movable contact enable a self-centering effect of the first electrode and/or the second electrode relative to the movable contact. In other words, a more accurate relative positioning of the movable contact and the first electrode and/or the second electrode is enabled when the closing switch is closed, i.e. when the movable contact adopts the closed position. This self-centering effect results in an electrical connection of lower electrical resistance between the first electrode and the second electrode and a stronger connection between the movable contact and the first electrode and the second electrode, respectively, in comparison with a closing switch having rigidly attached electrodes. A low electrical resistance reduces the risk of overheating and melting of the first electrode and the second electrode. The strong connection reduces the risk of unintentional electrical separation of the first electrode and the second electrode.

The tapered profile may be continuously tapered. Alternatively, the tapered profile may be intermittently tapered, for example comprising two tapered sections separated by a cylindrical portion, where each tapered section is configured to engage a respective one of the first electrode opening and the second electrode opening.

Throughout the present disclosure, the tapered profile may be conical. Alternatively, the tapered profile may be wedge shaped. In any case, the shapes of the first electrode opening and the second electrode opening are substantially complementary, or complementary, to the shape of the tapered profile.

The closing switch may further comprise a first housing opening in the housing, wherein the first electrode is arranged in the first housing opening with a first play; and/or a second housing opening in the housing, wherein the second electrode is arranged in the second housing opening with a second play. In this way, the first electrode is allowed to move slightly relative to the first housing opening within the first play and/or the second electrode is allowed to move slightly relative to the second housing opening within the second play. The first play and/or the second play may be 0.05 mm to 0.7 mm, such as 0.1 mm to 0.5 mm, such as approximately 0.2 mm.

The first electrode may be arranged to move within the first play substantially parallel with the closing axis (e.g. up and down), and/or the second electrode may be arranged to move within the second play substantially parallel with the closing axis. Alternatively, or in addition, the first electrode may be arranged to move within the first play substantially perpendicular, or perpendicular, to the closing axis (e.g. in lateral directions of the electrode) and/or the second electrode may be arranged to move within the second play substantially perpendicular, or perpendicular, to the closing axis. A substantially perpendicular direction may include angular deviations of less than 20%, such as less than 10%, such as less than 5%, from a perfectly perpendicular direction. The first play and the second play may also allow a slight tilting of the first electrode and the second electrode, respectively.

The closing switch may further comprise a first flexible member, wherein the first electrode is attached to the housing by means of the first flexible member; and/or a second flexible member, wherein the second electrode is attached to the housing by means of the second flexible member. Each of the first flexible member and the second flexible member may be made of an insulating material, such as plastic.

The first flexible member may establish a first load path arranged to take at least 95%, such as at least 99%, of the loads between the first electrode and the housing, and/or the second flexible member may establish a second load path arranged to take at least 95%, such as at least 99%, of the loads between the second electrode and the housing. Each load path may be a mechanical load path.

The loads between the first electrode and the housing may be the weight of the first electrode. The loads between the second electrode and the housing may be the weight of the second electrode. Thus, a major portion (e.g. at least 95%, such as at least 99%) of the weight of the first electrode may be carried by the first flexible member and/or a major portion (e.g. at least 95%, such as at least 99%) of the weight of the second electrode may be carried by the second flexible member. For example, the first electrode may be attached to the housing only by the first flexible member and the second electrode may be attached to the housing only by the second flexible member.

The first flexible member and/or the second flexible member may comprise, e.g. be constituted by, a spring pin. Each spring pin may be held by the housing and by a respective electrode of the first electrode and the second electrode. For each spring pin, a major length of the spring pin may be held by the housing and a minor length of the spring pin may be held by a respective electrode of the first electrode and the second electrode.

As an alternative, the first flexible member and/or the second flexible member may comprise, e.g. be constituted by, a flexible holder for holding a rigid pin. For example, the closing switch may comprise a first rigid pin attached to the first electrode and to a first flexible holder, and a second rigid pin attached to the second electrode and to a second flexible holder.

The first electrode may be arranged to move substantially perpendicular, or perpendicular, to the closing axis (e.g. in a longitudinal direction) against a deformation of the first flexible member, and/or the second electrode may be arranged to move substantially perpendicular, or perpendicular, to the closing axis against a deformation of the second flexible member.

Each of the tapered profile, the first electrode opening and the second electrode opening may have a tapering ratio from 1:5 to 1:20, such as from 1:8 to 1:14, such as from 1:10 to 1:12, such as 1:10. The tapering ratio may be defined as a difference between a cross-sectional dimension perpendicular to the closing axis at a first section of the tapered profile and a cross-sectional dimension perpendicular to the closing axis at a second section of the tapered profile in relation to a distance along the closing axis between the first section and the second axis. For example, in case the tapered profile is conical, the tapering ratio may be defined as the difference between two diameters of the cone in relation to the distance between the two diameters.

The actuator may be configured to be actuated by an explosion produced within the closing switch and initiated by an electric current. The actuator may thus be a pyrotechnical actuator. The pyrotechnical actuator provides a fast closing of the closing switch. The pyrotechnical actuator may for example comprise a chemical charge that is triggered by an electric current to cause a fast pressure buildup due to an exothermic reaction of the charge. The fast pressure buildup rapidly accelerates the movable contact.

The housing may comprise a guiding channel and the movable contact may comprise a guiding section slidingly arranged in the guiding channel for guiding the movable contact relative to the housing along the closing axis. The guiding channel and the guiding section may have substantially complementary, or complementary, shapes.

Each of the guiding section and the guiding channel may be circular. The movable contact may optionally be locked against rotation about the closing axis by means of the sliding engagement between the guiding section and the guiding channel. For example, each of the guiding section and the guiding channel may be non-circular, e.g. polygonal, or the guiding section or the guiding channel may comprise a rotationally locking structure.

According to a further aspect there is provided a switchgear comprising a closing switch according to the present disclosure. The second electrode may be connected to a load side of the switchgear and the first electrode may be connected to an electrical ground.

The switchgear may be a low voltage switchgear. Throughout the present disclosure, a low voltage may be a voltage less than 50 kV.

BRIEF DESCRIPTION OF THE DRAWINGS

Further details, advantages and aspects of the present disclosure will become apparent from the following embodiments taken in conjunction with the drawings, wherein.

DETAILED DESCRIPTION

Figure 1:
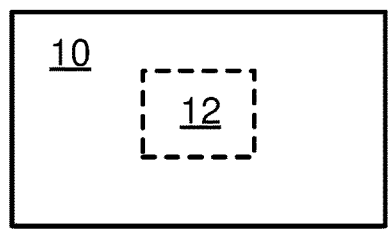
FIG. 1: schematically represents a switchgear comprising a closing switch.

In the following, an electrical short-circuiting closing switch and a switchgear comprising such closing switch, will be described. The same reference numerals will be used to denote the same or similar structural features.

FIG. 1 schematically represents a low voltage switchgear 10 comprising a closing switch 12 according to the present disclosure. The closing switch 12 is used to short-circuit the switchgear 10 for internal arc protection. The operating voltage of the switchgear 10 is for example less than 50 kV.

Figure 2:
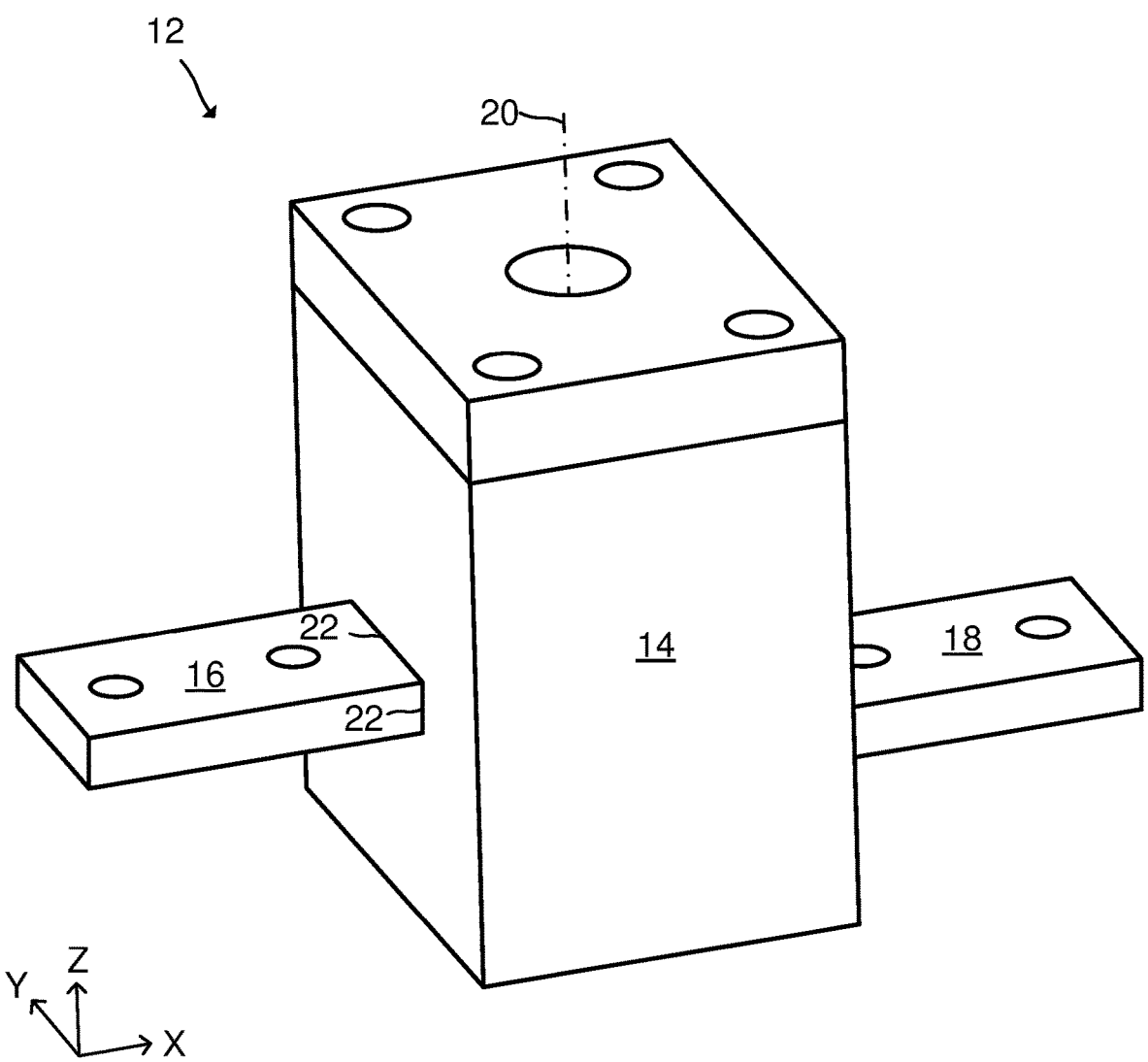
FIG. 2: schematically represents a perspective view of the closing switch in FIG. 1.

FIG. 2 schematically represents a perspective view of the closing switch 12 in FIG. 1. The closing switch 12 comprises a housing 14, a first electrode 16 and a second electrode 18. The second electrode 18 can be connected to the load side of the switchgear 10 and the first electrode 16 can be connected to electrical ground.

FIG. 2 further shows a closing axis 20 and a first housing opening 22 in the housing 14, which are described below. The housing 14 comprises an electrically insulating material, such as plastic. Each of the first electrode 16 and the second electrode 18 is here exemplified as a flat plate of an electrically conductive material, such as copper.

FIG. 2 further shows a Cartesian coordinate system for referencing purposes. In FIG. 2, the closing switch 12 is oriented vertically, such that the closing axis 20 is vertical.

Figure 3:
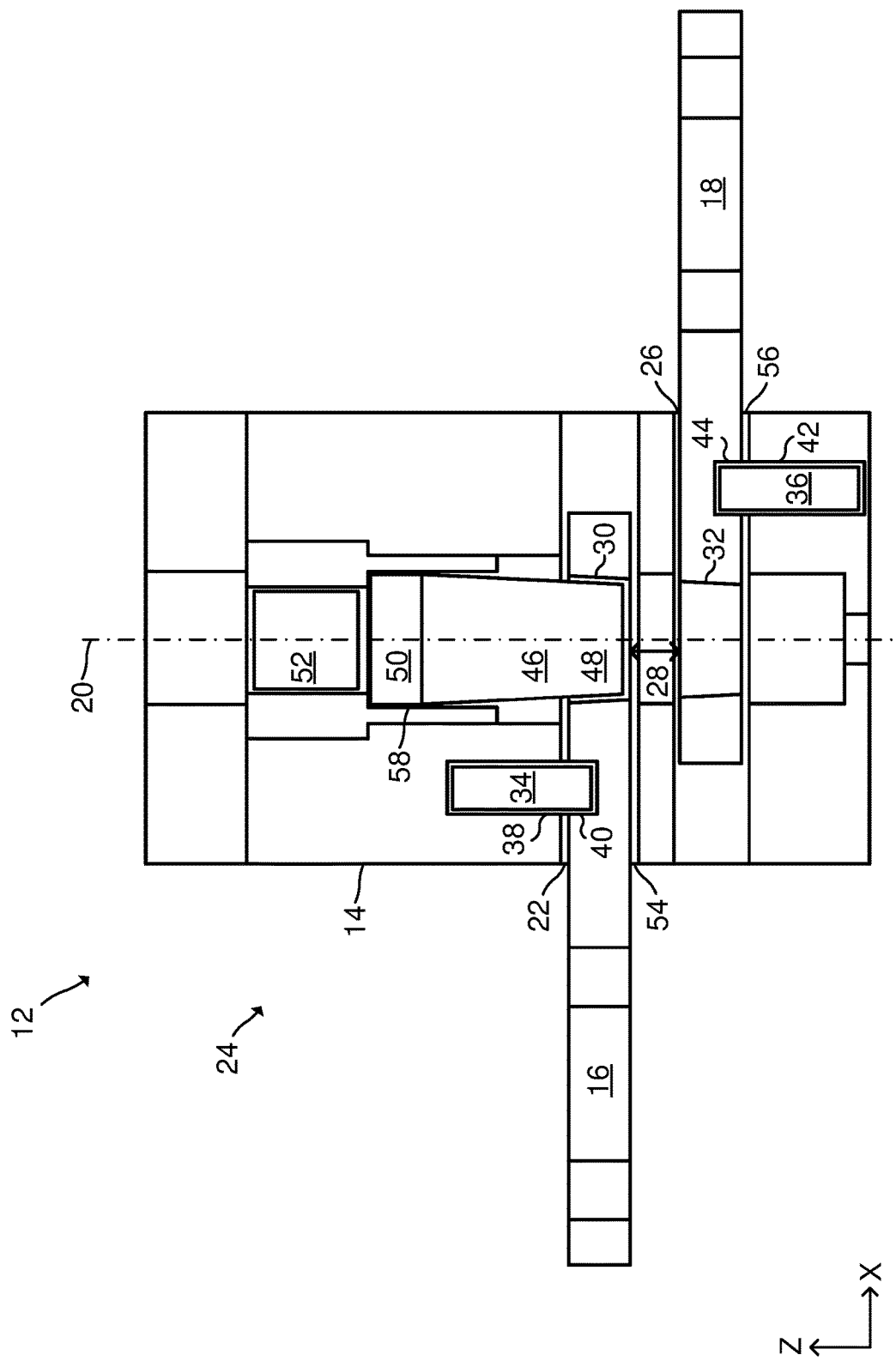
FIG. 3: schematically represents a cross-sectional side view of the closing switch in FIGS. 1 and 2 in an open position.

FIG. 3 schematically represents a cross-sectional side view of the closing switch 12 in FIGS. 1 and 2 in an open position 24. In FIG. 3, a second housing opening 26 of the housing 14 can be seen. The first electrode 16 is received in the first housing opening 22 and the second electrode 18 is received in the second housing opening 26. The first electrode 16 and the second electrode 18 are generally parallel and separated by a gap 28, such as an air gap or a gas gap.

The first electrode 16 comprises a tapered first electrode opening 30. The second electrode 18 comprises a tapered second electrode opening 32. In the example in FIG. 3, each of the first electrode opening 30 and the second electrode opening 32 is a through hole. The second electrode opening 32 is slightly smaller than the first electrode opening 30. Each of the first electrode opening 30 and the second electrode opening 32 is substantially concentric with the closing axis 20.

The closing switch 12 further comprises a first flexible member 34 and a second flexible member 36. In this example, each of the first flexible member 34 and the second flexible member 36 is a cylindrical spring made of an insulating flexible material, such as plastic. The first electrode 16 is connected to the housing 14 by means of the first flexible member 34 and the second electrode 18 is connected to the housing 14 by means of the second flexible member 36. Due to the flexibility of the first flexible member 34 and the second flexible member 36, each of the first electrode 16 and the second electrode 18 is flexibly attached to the housing 14.

The first flexible member 34 is fastened in a first housing hole 38 in the housing 14 and in a first electrode hole 40 in the first electrode 16. The second flexible member 36 is fastened in a second housing hole 42 in the housing 14 and in a second electrode hole 44 in the second electrode 18. A major length (here approximately 70%) of the first flexible member 34 is received in the first housing hole 38 and a minor length (here approximately 25%) is received in the first electrode hole 40. Similarly, a major length (here approximately 70%) of the second flexible member 36 is received in the second housing hole 42 and a minor length (here approximately 25%) is received in the second electrode hole 44.

In this example, the first electrode 16 is connected to the housing 14 only by means of the first flexible member 34 and the second electrode 18 is connected to the housing only by means of the second flexible member 36. In the open position 24, a first load path is established by the first flexible member 34 through which all loads between the first electrode 16 and the housing 14 are transferred, and a second load path is established by the second flexible member 36 through which all loads between the second electrode 18 and the housing 14 are transferred.

The closing switch 12 further comprises a movable contact 46 having a tapered profile 48. The movable contact 46 is movable along the closing axis 20 from the open position 24 in FIG. 3 to a closed position. The movable contact 46 is here constituted by a piston and comprises the tapered profile 48 and a cylindrical guiding section 50.

In the open position 24, the movable contact 46 is separated from each of the first electrode 16 and the second electrode 18. The movable contact 46 does however not necessarily need to be electrically disconnected from the first electrode 16 in the open position 24 of the movable contact 46. In the example in FIG. 3, the lower end of the tapered profile 48 is positioned within the first electrode opening 30 without contacting the first electrode 16. The closing axis 20 is concentric with the tapered profile 48.

The tapered profile 48 has a shape corresponding to the shapes of the first electrode opening 30 and the second electrode opening 32. In this example, the tapered profile 48, the first electrode opening 30 and the second electrode opening 32 are each conical and taper downwardly in FIG. 3.

In the example in FIG. 3, the tapered profile 48 has a tapering ratio of 1:10. Each of the first electrode opening 30 and the second electrode opening 32 also has a tapering ratio of 1:10.

The widest portion of the tapered profile 48 (the uppermost in FIG. 3) and the guiding section 50 may for example have a diameter of 26.00 mm. In this case, the first electrode 16 may have a thickness of 12.50 mm, the upper widest portion of the first electrode opening 30 may have a diameter of 26.00 mm and the lower narrowest portion of the first electrode opening 30 may have a diameter of 24.75 mm. Furthermore, in this case, the second electrode 18 may have a thickness of 12.50 mm, the upper widest portion of the second electrode opening 32 may have a diameter of 23.75 mm and the lower narrowest portion of the second electrode opening 32 may have a diameter of 22.50 mm. The gap 28 may for example be 10.00 mm.

The closing switch 12 further comprises an actuator 52. The actuator 52 is arranged to force the movable contact 46 from the open position 24 to the closed position. In this example, the actuator 52 is a pyrotechnical actuator comprising a chemical charge that can be triggered by an electric current.

The first electrode 16 is received in the first housing opening 22 with a first play 54 and the second electrode 18 is received in the second housing opening 26 with a second play 56. The first play 54 surrounds the first electrode 16 and the second play 56 surrounds the second electrode 18, i.e. in respective planes parallel with the YZ-plane. Each of the first electrode 16 and the second electrode 18 is thereby allowed to move slightly vertically in the Z-direction (parallel with the closing axis 20) and laterally in the Y-direction (perpendicular to the closing axis 20) against the deformation of the first flexible member 34 and the second flexible member 36, respectively. Due to the first play 54 and the second play 56, each of the first electrode 16 and the second electrode 18 is further also allowed to rotate slightly about each of the X-axis, Y-axis and Z-axis against the deformation of the first flexible member 34 and the second flexible member 36, respectively. Each of the first play 54 and the second play 56 may for example be 0.2 mm.

The closing switch 12 further comprises a guiding channel 58. The guiding channel 58 has a shape and dimension substantially equal to the shape and dimension of the guiding section 50 of the movable contact 46. In this example, each of the guiding channel 58 and the guiding section 50 is cylindrical.

During arc flash, the actuator 52 is triggered by an electric current, e.g. a 24 V signal, which causes an explosion of the chemical charge. The chemical charge explosion builds up pressure and rapidly accelerates the movable contact 46. When actuated, the actuator 52 can accelerate the movable contact 46 to 25 m/s. The movable contact 46 thereby moves along the closing axis 20 from the open position 24 to the closed position where the movable contact 46 establishes an electrical connection between the first electrode 16 and the second electrode 18 and closes the gap 28.

During its movement, the movable contact 46 is guided linearly relative to the housing 14 along the closing axis 20 by means of the engagement of the guiding section 50 in the guiding channel 58. The pyrotechnical actuator 52 enables the closing switch 12 to be closed in less than 2 ms after electrical triggering.

Figure 4:
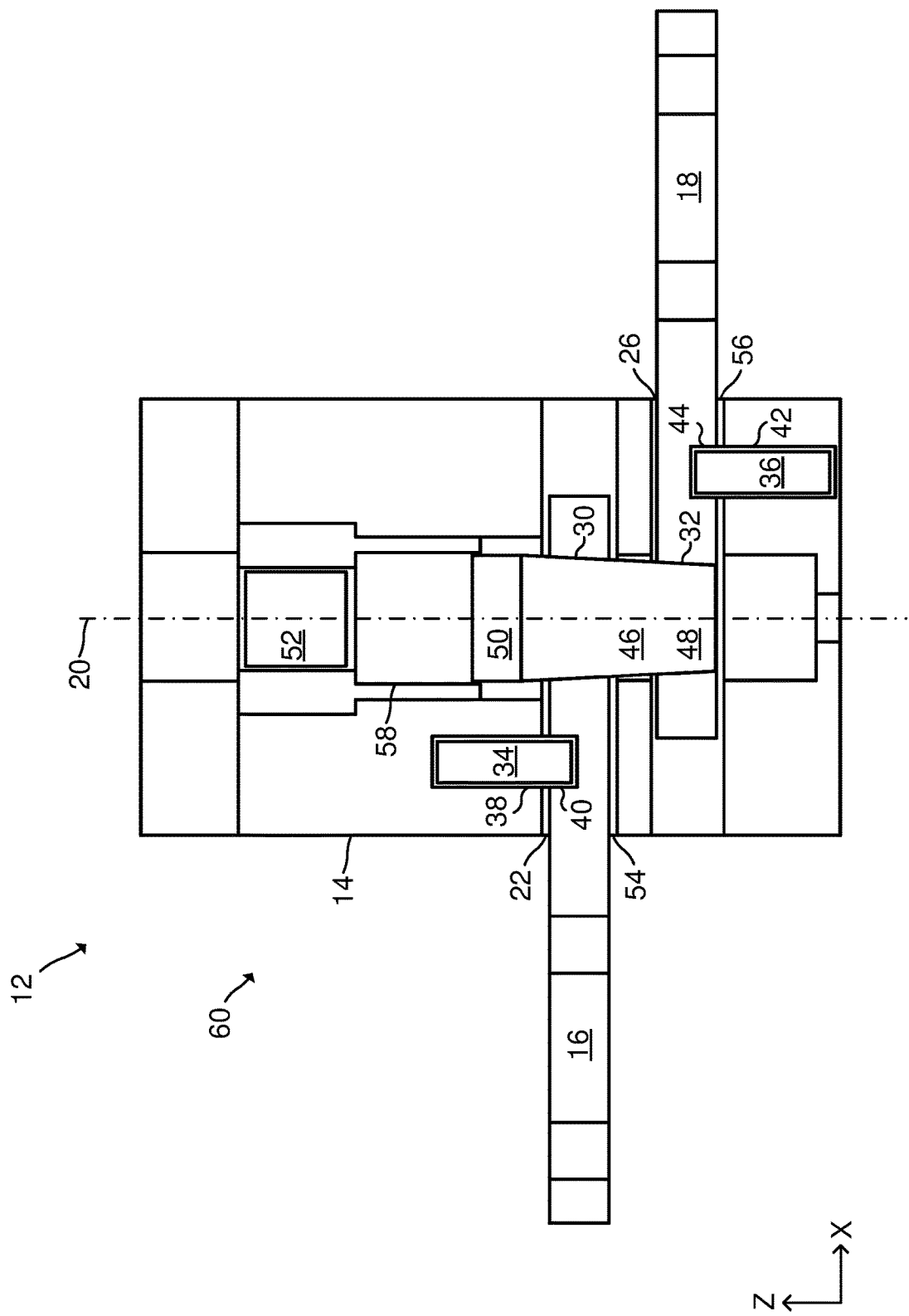
FIG. 4: schematically represents a cross-sectional side view of the closing switch in FIGS. 1-3 in a closed position.

FIG. 4 schematically represents a cross-sectional side view of the closing switch 12 in FIGS. 1-3 in the closed position 60. As shown in FIG. 4, the tapered profile 48 of the movable contact 46 has established an electrical bridge between the first electrode 16 and the second electrode 18 in the closed position 60 of the movable contact 46.

Due to the flexible attachment of the first electrode 16 and the second electrode 18 to the housing 14, each of the first electrode 16 and the second electrode 18 is allowed to move slightly relative to the housing 14 during the closing movement of the movable contact 46. Misalignments of the first electrode opening 30 and/or the second electrode opening 32, such as non-concentricities of with respect to the closing axis 20, are automatically eliminated by the force of the movable contact 46. That is, when the tapered profile 48 comes into contact with a surface or edge of the first electrode opening 30 or the second electrode opening 32 during the closing movement of the movable contact 46, the tapered profile 48 will push the first electrode 16 and/or the second electrode 18 into alignment against the deformation of the first flexible member 34 and/or the second flexible member 36. In this way, the first electrode 16 and the second electrode 18 are automatically self-centered when closing the movable contact 46.

When the movable contact 46 has seated in the first electrode opening 30 and the second electrode opening 32, the movable contact 46 electrically connects the first electrode 16 and the second electrode 18 by means of the tapered profile 48 and a strong clamping engagement is established due to some mechanical deformation. The movable contact 46 becomes squeezed or wedged into the first electrode opening 30 and the second electrode opening 32.

The flexible attachment allows the first electrode 16 and the second electrode 18 to rearrange in relation to the movable contact 46. Thereby, a very good electrical contact with low electrical resistance and a strong connection can be established, without requiring narrow tolerances. A very high force is needed to retract the movable contact 46 back from the closed position 60 along the closing axis 20. The relaxed tolerance requirements derived from the flexible attachment of the first electrode 16 and the second electrode 18 enable manufacture of a high performing closing switch 12 at low cost.

The applicant has carried out tests of the closing switch 12 showing that the electrical resistance between the first electrode 16 and the second electrode 18 can be as low as 3 μΩ in and that the contact force between the movable contact 46 and the first electrode 16 and the second electrode 18 can be as high as 38 kN.

While the present disclosure has been described with reference to exemplary embodiments, it will be appreciated that the present invention is not limited to what has been described above. For example, it will be appreciated that the dimensions of the parts may be varied as needed.

The invention claimed is:

1. An electrical short-circuiting closing switch comprising:
   an electrically insulating housing;
   a first electrode having a tapered first electrode opening;
   a second electrode having a tapered second electrode opening;

a movable contact having a tapered profile, the movable contact being movable relative to the housing along a closing axis from an open position, in which the movable contact is electrically disconnected from the second electrode, to a closed position, in which the movable contact electrically connects the first electrode and the second electrode by engaging the tapered profile with the first electrode opening and the second electrode opening; and an actuator arranged to force the movable contact from the open position to the closed position;

wherein at least one of the first electrode and the second electrode is flexibly attached to the housing.

2. The closing switch according to claim 1, wherein each of the tapered profile, the first electrode opening and the second electrode opening is conical.

3. The closing switch according to claim 1, further comprising:

a first housing opening in the housing, wherein the first electrode is arranged in the first housing opening with a first play; and/or a second housing opening in the housing, wherein the second electrode is arranged in the second housing opening with a second play.

4. The closing switch according to claim 3, wherein the first play and/or the second play is 0.05 mm to 0.7 mm.

5. The closing switch according to claim 3, wherein the first electrode is arranged to move within the first play substantially parallel with the closing axis, and/or wherein the second electrode is arranged to move within the second play substantially parallel with the closing axis.

6. The closing switch according to claim 1, further comprising:

a first flexible member, wherein the first electrode is attached to the housing by means of the first flexible member; and/or a second flexible member, wherein the second electrode is attached to the housing by means of the second flexible member.

7. The closing switch according to claim 6, wherein the first flexible member establishes a first load path arranged to take at least 95% of the loads between the first electrode and the housing, and/or wherein the second flexible member establishes a second load path arranged to take at least 95% of the loads between the second electrode and the housing.

8. The closing switch according to claim 6, wherein the first flexible member and/or the second flexible member includes a spring pin.

9. The closing switch according to claim 6, wherein the first electrode is arranged to move substantially perpendicular to the closing axis against a deformation of the first flexible member, and/or wherein the second electrode is arranged to move substantially perpendicular to the closing axis against a deformation of the second flexible member.

10. The closing switch according to claim 1, wherein each of the tapered profile, the first electrode opening and the second electrode opening has a tapering ratio from 1:5 to 1:20.

11. The closing switch according to claim 1, wherein the actuator is configured to be actuated by an explosion produced within the closing switch and initiated by an electric current.

12. The closing switch according to claim 1, wherein the housing comprises a guiding channel and the movable contact includes a guiding section slidingly arranged in the guiding channel for guiding the movable contact relative to the housing along the closing axis.

13. The closing switch according to claim 12, wherein each of the guiding section and the guiding channel is circular.

14. A switchgear comprising a closing switch, wherein the closing switch includes:

an electrically insulating housing;

a first electrode having a tapered first electrode opening;

a second electrode having a tapered second electrode opening;

a movable contact having a tapered profile, the movable contact being movable relative to the housing along a closing axis from an open position, in which the movable contact is electrically disconnected from the second electrode, to a closed position, in which the movable contact electrically connects the first electrode and the second electrode by engaging the tapered profile with the first electrode opening and the second electrode opening; and an actuator arranged to force the movable contact from the open position to the closed position;

wherein at least one of the first electrode and the second electrode is flexibly attached to the housing.

15. The switchgear according to claim 14, wherein the switchgear is a low voltage switchgear.

16. The closing switch according to claim 2, further comprising:

a first housing opening in the housing, wherein the first electrode is arranged in the first housing opening with a first play; and/or a second housing opening in the housing, wherein the second electrode is arranged in the second housing opening with a second play.

17. The closing switch according to claim 4, wherein the first electrode is arranged to move within the first play substantially parallel with the closing axis, and/or wherein the second electrode is arranged to move within the second play substantially parallel with the closing axis.

18. The closing switch according to claim 2, further comprising:

a first flexible member, wherein the first electrode is attached to the housing by means of the first flexible member; and/or a second flexible member, wherein the second electrode is attached to the housing by means of the second flexible member.

19. The closing switch according to claim 4, wherein the first play and/or the second play is 0.1 mm to 0.5 mm.

20. The closing switch according to claim 10, wherein the tapering ratio is from 1:8 to 1:14.

* * * * *